(12) United States Patent
Pastore et al.

(10) Patent No.: US 12,432,243 B2
(45) Date of Patent: *Sep. 30, 2025

(54) METHODS OF MONITORING AND PROTECTING ACCESS TO ONLINE SERVICES

(71) Applicant: Cleafy Società per Azioni, Milan (IT)

(72) Inventors: Nicolò Pastore, Pero (IT); Emanuele Parrinello, Crema (IT); Carmine Giangregorio, Milan (IT)

(73) Assignee: CLEAFY SOCIETÀ PER AZIONI, Milan (IT)

( * ) Notice: Subject to any disclaimer, the term of this patent is extended or adjusted under 35 U.S.C. 154(b) by 237 days.

This patent is subject to a terminal disclaimer.

(21) Appl. No.: 17/211,646

(22) Filed: Mar. 24, 2021

(65) Prior Publication Data

US 2021/0306369 A1 Sep. 30, 2021

(30) Foreign Application Priority Data

Mar. 25, 2020 (IT) .................. 102020000006340

(51) Int. Cl.
*H04L 9/40* (2022.01)
*G06F 21/31* (2013.01)
*G06F 21/57* (2013.01)

(52) U.S. Cl.
CPC ...... *H04L 63/1433* (2013.01); *H04L 63/1416* (2013.01); *H04L 63/1425* (2013.01); *H04L 2463/082* (2013.01); *H04L 2463/146* (2013.01)

(58) Field of Classification Search
CPC ............. H04L 63/1433; H04L 63/1416; H04L 63/1425; H04L 2463/082; H04L 2463/146;

(Continued)

(56) References Cited

U.S. PATENT DOCUMENTS 9,838,384 B1 12/2017 Kane-Parry et al.
10,275,613 B1 4/2019 Olenoski et al.
(Continued)

FOREIGN PATENT DOCUMENTS

EP 3021550 A1 5/2016
EP 3021551 A1 5/2016
(Continued)

OTHER PUBLICATIONS

U.S. Appl. No. 17/211,323, filed Mar. 24, 2021.
(Continued)

*Primary Examiner* — Farid Homayounmehr
*Assistant Examiner* — Mudasiru K Olaegbe
(74) *Attorney, Agent, or Firm* — MH2 TECHNOLOGY LAW GROUP LLP

(57) ABSTRACT

A method of monitoring and protecting access to an online service from Account Take Over may include: providing a Traffic Inspector in communication with at least one device for Internet browsing and with a web server; providing a Traffic Analyzer in communication with the Traffic Inspector; identifying each browsing session of the at least one device; extracting and identifying one or more usernames when a user performs authentication to the service by analyzing traffic exchanged between the at least one device and the web server; collecting first characteristic data concerning unique and/or non-unique technical parameters and associating the first characteristic data with respective identified one or more usernames; identifying each anonymous web beacon generated by the at least one device on the service; and collecting second characteristic data concerning unique and/or non-unique technical parameters and associating the second characteristic data with the anonymous web beacon.

20 Claims, 6 Drawing Sheets

(58) Field of Classification Search
CPC ... H04L 63/1483; G06F 21/31; G06F 21/577; G06F 21/6263; G06F 21/552
See application file for complete search history.

(56) References Cited

U.S. PATENT DOCUMENTS

| | | | |
|---|---|---|---|
| 10,346,856 | B1 | 7/2019 | Kohli et al. |
| 10,496,263 | B2 | 12/2019 | So et al. |
| 11,140,158 | B1* | 10/2021 | Adam ............... H04L 67/34 |
| 11,444,962 | B2* | 9/2022 | Crume ............. H04L 63/1416 |
| 11,973,768 | B2 | 4/2024 | Pastore et al. |
| 2002/0046170 | A1 | 4/2002 | Gvily |
| 2004/0059931 | A1 | 3/2004 | Fulkerson, Jr. et al. |
| 2008/0244076 | A1 | 10/2008 | Shah et al. |
| 2008/0255944 | A1 | 10/2008 | Shah et al. |
| 2008/0263197 | A1 | 10/2008 | Stephens |
| 2009/0089869 | A1* | 4/2009 | Varghese ............ G07F 7/1008 726/7 |
| 2009/0168995 | A1 | 7/2009 | Banga et al. |
| 2009/0327141 | A1 | 12/2009 | Rabin et al. |
| 2010/0180775 | A1 | 7/2010 | Kollep et al. |
| 2011/0022704 | A1* | 1/2011 | Duan ................ G06F 16/957 709/224 |
| 2012/0291129 | A1 | 11/2012 | Shulman et al. |
| 2013/0055339 | A1 | 2/2013 | Apostolescu et al. |
| 2013/0132508 | A1* | 5/2013 | Lucash ............... H04L 67/02 709/217 |
| 2013/0179982 | A1 | 7/2013 | Bridges et al. |
| 2013/0183949 | A1 | 7/2013 | Sulmar |
| 2014/0075014 | A1 | 3/2014 | Chourey |
| 2014/0298469 | A1 | 10/2014 | Marion et al. |
| 2014/0337513 | A1 | 11/2014 | Amalapurapu et al. |
| 2015/0326595 | A1 | 11/2015 | Liu et al. |
| 2015/0350243 | A1 | 12/2015 | Call et al. |
| 2016/0034468 | A1 | 2/2016 | Hart et al. |
| 2016/0057628 | A1 | 2/2016 | Sewall et al. |
| 2016/0248788 | A1 | 8/2016 | Saito et al. |
| 2017/0063885 | A1 | 3/2017 | Wardman et al. |
| 2017/0063889 | A1* | 3/2017 | Muddu ................ G06N 20/20 |
| 2017/0289173 | A1 | 10/2017 | Resch et al. |
| 2018/0033089 | A1* | 2/2018 | Goldman ............ H04L 63/102 |
| 2018/0152471 | A1 | 5/2018 | Jakobsson |
| 2018/0212993 | A1* | 7/2018 | Call .................. G06F 21/566 |
| 2018/0217850 | A1 | 8/2018 | Kolesnikov et al. |
| 2018/0309721 | A1* | 10/2018 | Ashley ............... H04L 63/06 |
| 2018/0316665 | A1 | 11/2018 | Caldera et al. |
| 2019/0058719 | A1 | 2/2019 | Kar et al. |
| 2019/0182214 | A1 | 6/2019 | Liu et al. |
| 2019/0349351 | A1* | 11/2019 | Verma ................ H04L 63/30 |
| 2020/0137105 | A1 | 4/2020 | Endler |
| 2020/0137580 | A1* | 4/2020 | Yang ................. H04W 12/122 |
| 2020/0153836 | A1 | 5/2020 | Johnson et al. |
| 2020/0177623 | A1 | 6/2020 | Call et al. |
| 2021/0021637 | A1* | 1/2021 | Srivastava ......... H04L 63/0876 |
| 2021/0029137 | A1 | 1/2021 | Wright et al. |
| 2021/0243207 | A1 | 8/2021 | Crume |
| 2021/0258318 | A1 | 8/2021 | Greene |
| 2021/0306355 | A1 | 9/2021 | Pastore et al. |
| 2021/0306376 | A1 | 9/2021 | Pastore et al. |
| 2021/0329451 | A1 | 10/2021 | Jun et al. |
| 2022/0303293 | A1 | 9/2022 | Pastore et al. |
| 2023/0034910 | A1 | 2/2023 | Engelberg et al. |

FOREIGN PATENT DOCUMENTS

| | | |
|---|---|---|
| EP | 3885945 B1 | 11/2023 |
| EP | 4068125 B1 | 1/2024 |
| WO | 2012/166669 A2 | 12/2012 |

OTHER PUBLICATIONS

U.S. Appl. No. 17/211,577, filed Mar. 24, 2021.
U.S. Appl. No. 17/696,721, filed Mar. 16, 2022.
International Search Report and Written Opinion in corresponding Italian Application No. 102020000006340 mailed on Nov. 10, 2020, 13 pages.
Office Action mailed Jan. 19, 2023, in U.S. Appl. No. 17/211,323.
Office Action mailed May 1, 2023, in U.S. Appl. No. 17/211,577.
InnovationQ Plus—IP.com (2023).
Extended European Search Report mailed Aug. 13, 2021, corresponding to U.S. Appl. No. 17/211,646.
Final Office Action mailed Aug. 2, 2023, in U.S. Appl. No. 17/211,323.
Final Office Action mailed Nov. 21, 2023, in U.S. Appl. No. 17/211,577.
Office Action mailed Feb. 23, 2024, in U.S. Appl. No. 17/696,721.

* cited by examiner

METHODS OF MONITORING AND PROTECTING ACCESS TO ONLINE SERVICES

CROSS-REFERENCE TO RELATED APPLICATION(S)

This application claims priority under 35 U.S.C. § 119 from Italian Patent Application No. 102020000006340, filed on Mar. 25, 2020, in the Italian Patent and Trademark Office ("IPTO"), the entire contents of which are incorporated herein by reference.

FIELD OF APPLICATION

The present description relates to a method of monitoring and protecting access to an online service from account take over. In particular, the present invention relates to a method of monitoring and protecting access to a web or mobile application.

The present description relates to a method of monitoring and protecting access to an online service from account take over as well as to a method of monitoring and protecting access to a web or mobile application against cyber attacks by malware, for example of the Man-in-the-Browser and/or Man-in-the-Middle and/or Bot Attack type, aimed at the theft of user credentials or so-called Account Take Over, abbr.: ATO.

DESCRIPTION OF THE TECHNICAL BACKGROUND

The use of antivirus software to counter computer attacks is known in the state of the art, also of the Man-in-the-Browser and/or Man-in-the-Middle and/or Bot Attack type.

For example, Man-in-the-Browser is an attack category consisting of directly manipulating the web browser in order to modify the content normally displayed by the user when visiting a website. Man-in-the-Browser (MitB) attacks are performed using malware installed on the user's computer without their knowledge. Such malware (e.g., Proxy Trojan horse) interact with the memory of web browser processes, so as to redirect the normal flow of system calls (used by the web browser) to malware features which are intended, for example, to inject additional Hypertext Markup Language (HTML) code into the downloaded web page. It should be noted that, in the case of a Man-in-the-Browser attack, the connection is to the original web server of the attacked site, making it extremely difficult to detect the attack. Therefore, the web browser and web application are unable to locate the content which the malware has added to the content actually downloaded from the web server. Several types of Man-in-the-Browser attacks have been detected, including the theft of credit card codes from e-banking and e-commerce sites and the execution of fraudulent economic transactions often initiated automatically without user interaction.

In detail, when a user requests a web page (i.e., web application) through a web browser, the web server on which the web page resides sends an HTML source code Document Object Model (DOM) to the web browser. The DOM code is passed to the web browser rendering engine in order to be displayed by the user. For example, in the case of a personal computer (PC) infected with malware, the DOM code which the web browser receives from the web server is modified by the malware before being processed by the web browser rendering engine. In fact, the malware injects an additional code (e.g., script) into the DOM code received by the web server so as to modify the content displayed by the user. Malware changes to DOM code downloaded from the web server are changes to HTML code and/or JavaScript, and/or another web content or resource. That is, the web browser is connected to the original web server while the malware causes changes to the downloaded DOM code. Such modifications may include graphic and/or behavioral alterations. Therefore, the user displays a web page with modified behavior and/or graphical representation with respect to the web page originally requested by the client. The client inadvertently gives access to their personal data or authorizes fraudulent actions against them.

By way of example, in the banking world, the computer infected with malware normally connects to the online banking site with Hypertext Transfer Protocol (HTTP), downloading the data from the web page. However, this data is altered in real time by the malware, adding scripts which allow to request the user's access data to the online banking web page.

A further example is Bot Attack, as illustrated in FIG. 1. Such attacks take the form of page requests from an automatic system, rather than from a human person. This can result in very high bandwidth consumption for the service provider. In addition, the automatic systems could use the service in an undesirable and illegal manner. Known examples are web scraping (i.e., extraction of data from the web service) or carding (i.e., in the validation phase of stolen credit cards), or brute-force login (i.e., an attempt to search for a user's credentials on the login page of a web application).

Operating malware on mobile devices could be of the types described above or could be other specific types. For example, Overlay malware could display a graphical interface which is identical or similar to a legitimate mobile application related to a service which requires credentials. A user could be unable to distinguish the legitimate application from the malicious Overlay application and enter their service credentials within the latter. Thereafter, the Overlay application could send the credentials to a malicious entity over a connection (e.g., WiFi, 3G, 4G, and 5G).

The aforementioned malware, as already stated, may be used to steal sensitive data from the user, such as access credentials to an online banking site. Under these circumstances, the malware prevents the user from logging in to the online banking site. In fact, the credentials entered by the user who believes to be regularly accessing the online banking platform are instead provided to the malware which simulated the access interface to the site and which engages the user by recreating an emulation of the online banking web page. Once this data is stolen from the user, the malware may send the collected credentials to an imposter. Parallel to the open session in which the unauthenticated user is operating, the imposter opens a new page where he enters the user's credentials for authentication. Once authenticated, the imposter can freely organise the account of the unsuspecting user, initiating fraudulent operations. This type of technique is referred to in the industry as Account Take Over (ATO), as the imposter takes control of the account by acting in the user's place without encountering any sort of hindrance. Furthermore, the attack could continue if the imposter manages to further exploit the malware-infected open session to obtain other sensitive data from the user, such as higher level login credentials necessary to carry out large money transactions.

Furthermore, it should be noted that an imposter could carry out an Account Take Over attack without using Malware. Such an attack could employ techniques known as phishing. For example, the imposter could induce a user to browse to a site identical to that of the authenticated online service. A technique could take advantage of sending an email with graphics similar to that of an official entity containing a link to the malicious phishing site. The unknowing user could be unable to distinguish the legitimate site from the malicious one and enter their credentials in the latter. The malicious site is controlled by the imposter, so the credentials are recorded or sent directly to the imposter. Subsequently, the imposter may use the collected credentials to authenticate with the online service and freely carry out the operations.

There are known techniques aimed at identifying such phishing attacks which include inserting resources within a site, such as an image. Since the imposter could copy the entire website to a phishing server controlled thereby, such resources could remain unchanged on the fraudulent site. When the fraudulent site is viewed in a web browser, these resources are downloaded from the original server since, in the meantime, they have remained unchanged. Thereby, by analyzing the requests to the original server it is possible to highlight a phishing attack through the presence of resource requests from a site other than the legitimate one.

A method of monitoring and protecting access to an online service from account take over is described in US2018/033089A1. Such a method first acquires the access data to the online service, and by processing the access data with one or more predictive models it is able to assign one or more risk scores to the browsing session. The method subsequently includes performing one or more risk reduction actions as a function of the one or more risk scores attributed to the monitored session.

A method for detecting security risks on a computer based on the analysis of previous communications is described in US2018/152471A1.

PROBLEMS OF THE BACKGROUND ART

The known systems allow to detect and possibly block the action of malware. See for example EP 3 021 550 A1 and EP 3 021 551 A1 describing, respectively, a malware detection method and a malware protection method.

However, in the case described above, it is not possible to know the identity of the user who, unaware of having been attacked by the malware, has not authenticated. In the scenario with malware in a session which is not yet authenticated, the prior art allows to identify the presence of the malware, but it is not possible to know to whom that infected session belongs. As a result, the malware has the ability to recover sensitive session data by forwarding it to an imposter who will open a new session, identifying himself with the data just stolen. The new session is then recognized as valid because it is authenticated. As anticipated before, the new session is opened using data stolen from the user with the so-called account take over technique.

Therefore, when the imposter opens a new session of the online banking platform and logs in regularly, already being provided with the correct credentials of the unsuspecting user, nothing can be done to prevent his fraudulent conduct against the user.

Furthermore, the techniques used to identify phishing attacks do not allow to associate the affected user with the identified phishing attack.

SUMMARY OF THE INVENTION

The object of the invention in question is to obtain a method of monitoring and protecting access to an online service able to overcome the drawbacks of the prior art.

A further object of the present invention is to obtain a method of monitoring and protecting access to an online service, such as a web or mobile application, which allows to protect the user from Account Take Over-type attacks.

ADVANTAGES OF THE INVENTION

By virtue of an embodiment, a method can be implemented which allows monitoring and protecting access to an online service, such as a web or mobile application, from Account Take Over attacks, reducing the risk of fraud against the user.

By virtue of a further embodiment, it is possible to obtain a method which allows to recognize one or more possible users hidden behind an anonymous browsing session of the web or mobile application attacked by malware, so as to be able to protect authenticated browsing sessions formally initiated by such users, but potentially by an imposter who has stolen the user's credentials.

BRIEF DESCRIPTION OF THE DRAWINGS

The features and advantages of the present invention will become apparent from the following detailed description of a possible practical embodiment thereof, illustrated by way of non-limiting example in the accompanying drawings, in which.

DETAILED DESCRIPTION

Even if not explicitly highlighted, the individual features described with reference to the specific embodiments shall be understood as accessory and/or interchangeable with other features, described with reference to other embodiments.

The present invention relates to a method of monitoring and protecting access to an online service from account take over. In particular, the object of the present invention is a method of monitoring and protecting the account of a user from an attack by an imposter F, for example with the use of malware M, aimed at the theft of user credentials for accessing the online service.

Within the scope of the present invention, an online service is a web and mobile service or application which requires credentials to be securely used by a user. A widespread online service relates to online, web or mobile banking platforms, which allow registered and authenticated users to carry out financial operations online, such as financial transactions. Specifically, a home banking service where a user can make a bank transfer after authenticating with credentials, for example username and password and optionally a temporary token.

Figure 1:
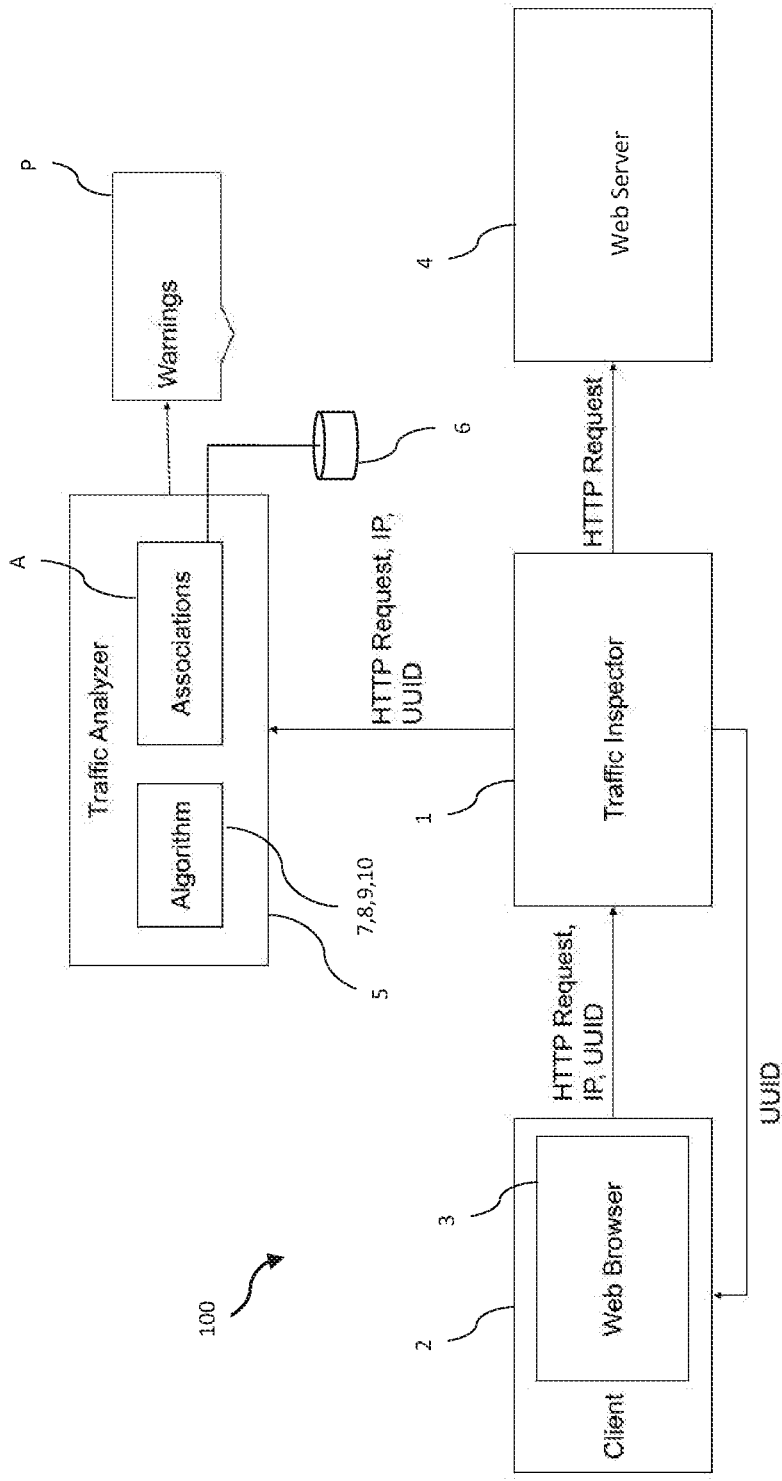
FIGS. 1 and 2 show a system 100 in which a first embodiment of the method of the present invention can be applied.
Figure 2:
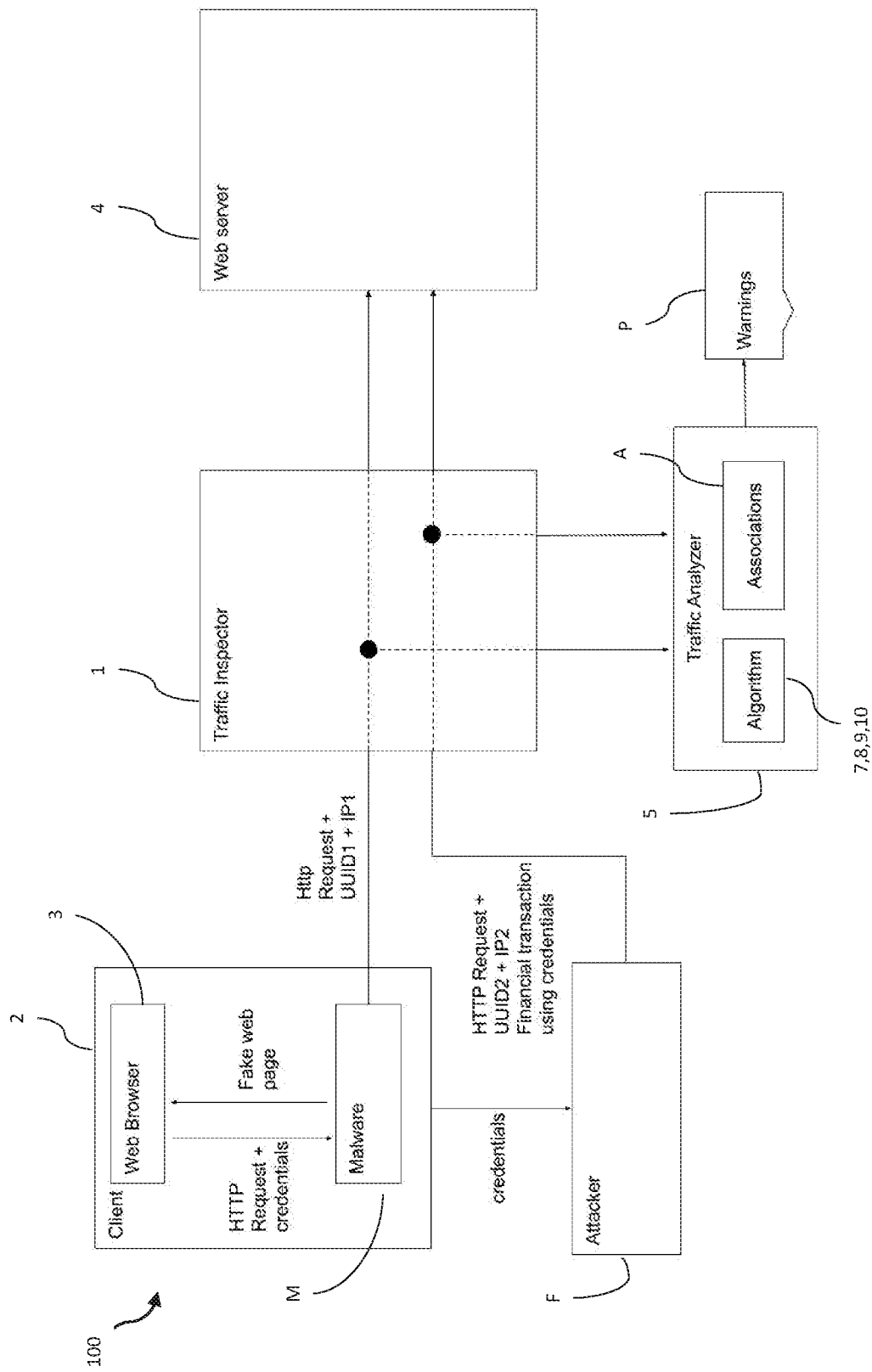

In the attached FIGS. 1 and 2, the number 100 refers to a system in which a first embodiment of the method of the present invention can be applied. In other words, the system 100 is referred to as a network environment, clearly consisting of devices and network components for hardware-type internet browsing, such as servers, databases and processing units, in which the first embodiment of the method of the present invention can be applied.

The method of monitoring and protecting access to an online service from account take over comprises the step of providing a traffic inspector 1 in signal communication with at least one client device 2 for internet browsing and with a web server 4 having an online service residing therein.

Within the scope of the present invention, a client device 2 means a device for internet browsing placed in signal communication with the web server 4. The client device 2 is capable of sending requests to the web server 4 and receiving responses through an internet network. The client device 2 may be a tablet, a laptop computer, a desktop computer, a smart TV, a smartwatch, a smartphone, or any other device capable of processing, communicating with a web server 4, and displaying content obtained from the web server 4, or content already present within the client device 2. The content could be viewed from a browser or other types of software. Such content could be in HTML, JavaScript, or other similar formats of a known type. Furthermore, the client device 2 could contain known operating systems such as Android, IOS, or Microsoft Windows.

Preferably, a web browser 3 resides in the client device 2 if the client device 2 is a computer, or a mobile application if the client device 2 is for example a smartphone or tablet.

Hereinafter, for brevity of presentation, reference will only be made to the exemplary case of the web browser 3 residing in the client device 2.

The method further comprising the step of providing a traffic analyzer 5 in signal communication with the traffic inspector 1.

Within the scope of the present invention, traffic inspector 1 means an inline device on web traffic between each client device 2 and the web server 4 having an online service residing therein. Therefore, the traffic inspector 1 is capable of intercepting the following communication information: Internet Protocol (IP) address of an HTTP request, cookies, headers, and the body of the same HTTP request. The traffic inspector 1 is preferably a hardware device, having software components residing therein, configured to generate a unique code and enter it in a cookie within the response to the HTTP request. More preferably, the traffic inspector 1 is configured to modify the DOM code of a web page by adding the code necessary to generate and send a fingerprint. Furthermore, the traffic inspector 1 is configured to send all the information collected during each user's browsing sessions on the online service residing in the web server 4 to the traffic analyzer 5.

Within the scope of the present invention, traffic analyzer 5 means a hardware device, having software components such as algorithms 7, 8, 9, 10 residing therein for: extracting the username from the information received by the traffic inspector 1 (extraction algorithm 10); associating the username with the unique information of the HTTP request from which it was extracted, such as IP and Universally Unique Identifier (UUID) entered in a cookie; estimating the username which generated the HTTP request if said request does not contain actual credentials, the estimate being based on the unique information present in the HTTP request associated with the estimated username(s) (user prediction algorithm 7); identifying an account take over attack (detection algorithm 8); protecting the user in the event of an attack (protection algorithm 9). Furthermore, the traffic analyzer 5 preferably comprises a database 6 for storing such associations A between username and unique information such as, for example, IP and UUID.

It should be noted that, according to a preferred solution of the invention, the traffic inspector 1 and the traffic analyzer 5 can be implemented in a single machine (or electronic device) which, therefore, is capable of carrying out the activities of the traffic inspector 1 and the traffic analyzer 5 with the same methods described herein.

The method comprising the step of identifying each browsing session of the client device 2, and preferably the web browser 3, on the online service by the traffic inspector 1.

The method also comprises the step of analyzing the traffic exchanged between the client device 2 and the web server 4, and preferably between the web browser 3 and the web server 4, by the traffic analyzer 5 to extract and identify at least one username when a user performs authentications to the online service.

In other words, the architecture based on traffic inspector 1 and traffic analyzer 5 allows monitoring web/mobile application traffic.

Furthermore, the method comprises the step of collecting by the traffic inspector 1 first characteristic data concerning unique and/or non-unique technical parameters and associating the first characteristic data with a respective identified username by the traffic analyzer 5.

The method comprises the step of storing the first characteristic data associated with each identified username in a database 6 associated with the traffic analyzer 5.

The method further comprises the step of identifying each anonymous browsing session of the client device 2, and preferably the web browser 3, on the online service by the traffic analyzer 5.

Within the scope of the present invention, an anonymous browsing session is an unauthenticated browsing session of an online service.

The method also comprises the step of collecting, by the traffic inspector 1, second characteristic data concerning unique and/or non-unique technical parameters and associating, by the traffic analyzer 5, the second characteristic data with the anonymous browsing session.

The method comprises the step of comparing by means of a user prediction algorithm 7 residing in the traffic analyzer 5 the first characteristic data concerning each identified username with the second characteristic data concerning the anonymous session to associate an identified username with the anonymous browsing in case of similarity or substantial coincidence between the first characteristic data and the second characteristic data so compared. That is, the method includes associating a set of possible users with the anonymous browsing session by means of a user prediction algorithm 7, which analyzes the set of technical parameters collected on the session and compares them with the history of previously collected, analyzed, or monitored authenticated parameters and sessions.

The method comprises the step of analyzing by means of a detection algorithm 8 residing in the traffic analyzer 5 each anonymous browsing session associated with one or more identified usernames to enter each username associated with the anonymous browsing session in which a situation involving a risk of credential theft has been detected in a watch list. In other words, the method includes identifying the presence of technical risks and not, for example, the presence of malware in a browsing session which has not yet been authenticated but with predicted users in the previous step of comparison with the user prediction algorithm 7, by means of continuous monitoring before authentication. If risks are present, the predicted and at-risk users are entered in the watch list.

In addition, the method comprises the step of monitoring the browsing sessions at risk associated with each username in the watch list when the respective user further performs authentication to the online service. In addition, this step involves identifying an account take over attack by the client device 2 when the anonymous browsing session and the subsequent authenticated session associated with the same username entered in the watch list are close in time. Furthermore, this step involves protecting access to the online service when an account take over risk is identified.

According to a preferred form of the invention, the step of monitoring the browsing sessions associated with each username in the watch list comprises the sub-steps of:
- identifying by means of the detection algorithm 8 the browsing sessions at risk associated with each username in the watch list when the respective user performs authentication to the online service;
- protecting the browsing sessions at risk using a protection algorithm 9 residing in the traffic analyzer 5.

Preferably, the step of protecting the browsing session at risk using the protection algorithm 9 comprises the step of locking the username of the user associated with the browsing session at risk, executing a Strong Customer Authentication (SCA) algorithm for the username of the user associated with the browsing session at risk, or executing a Multi-Factor Authentication (MFA) algorithm for the username of the user associated with the browsing session at risk. That is to say, when the method identifies a browsing session associated with an authenticated user, if such a user is present in the watch list of users at risk generated by the detection algorithm 8, the protection algorithm 9 triggers protection mechanisms such as, for example, user lockout, SCA, MFA, and/or reporting mechanisms to other systems or users. For example, the method may include a step of generating a warning P by the traffic analyzer 5 to signal the warning to the attacked user, to other systems, or to other users.

Preferably, the step of monitoring the browsing sessions associated with each username in the watch list comprises the step of generating a risk signal indicative of the presence of a possible threat associated with the malware attack in the browsing session at risk.

According to a preferred solution, the method comprising the step of removing a username from the watch list when the detection algorithm 8 detects that the malware attack has ended. It should be noted that it is possible to establish predefined criteria such that the detection algorithm 8 is capable of detecting if the attack is over.

Preferably, the step of removing a username from the watch list comprises the step of removing a username from the watch list when a predefined time interval has elapsed from the moment when the detection algorithm 8 has detected that the malware attack is over. That is to say, the username is automatically removed from the watch list when the risk condition expires, for example using a fixed timer.

In accordance with a preferred form, the step of collecting, by the traffic inspector 1, first characteristic data concerning unique and/or non-unique technical parameters and associating, by the traffic analyzer 5, the first characteristic data with a respective identified username comprises the sub-step of collecting, by the traffic inspector 1, first characteristic data concerning one or more of unique technical parameters, non-unique technical parameters, endpoints (e.g., fingerprint), networks (e.g., IP) and browsers (e.g., tracking and marking cookies). That is, this sub-step includes that the method associates the identified username and all the unique technical parameters and not the authenticated browsing session. Furthermore, the step of collecting, by the traffic inspector 1, second characteristic data concerning unique and/or non-unique technical parameters and associating, by the traffic analyzer 5, the second characteristic data with the anonymous browsing session comprises the sub-step of collecting, by the traffic inspector 1, second characteristic data concerning one or more of unique technical parameters, non-unique technical parameters, endpoints (e.g., fingerprint), networks (e.g., IP) and browsers (e.g., tracking and marking cookies).

Preferably, the first characteristic data and the second characteristic data comprise UUID and IP. It should be noted that in FIG. 2 the second characteristic data are indicated with IP1 and UUID1.

With reference to the embodiment in which the traffic inspector 1 is configured to modify the DOM code of a web page by adding the code necessary to generate and send a fingerprint, the code necessary to generate a fingerprint preferably contains the instructions necessary to capture some information which characterize an execution environment of the aforementioned code, such as for example the web browser 3 or a mobile client device 2. More preferably, the code contains instructions aimed at transforming the collected information, i.e., the first and second characteristic data, into a compact format. The device which executes these instructions contains instructions to send the collected information to the traffic analyzer 5. Still preferably, the instructions aimed at transforming the collected information into a compact format are executed both in the web browser 3 and within the traffic inspector 1. When the instructions aimed at transforming the collected information into a compact format are executed within the web browser 3, the code sends only the compact representation of the collected information to the traffic analyzer 5. Still preferably, the information collected relates to the list of typographical sources installed within the device. More preferably, the information collected is the screen size of the device. Although such information is not unique, it is distributed with sufficient rarity to allow the identification of a client device 2 based on the same. On some devices, the characteristic information could relate to information available only in certain types of devices. For example, some mobile devices offer native serial numbers. Advantageously, such information offers even greater guarantees regarding the uniqueness of the information collected. Furthermore, the code could capture further information than previously stated. The traffic analyzer 5 stores such information in a permanent database 6 together with information about the user associated with the client device 2, as they become available. When the traffic analyzer 5 receives the fingerprint information of a client device 2, it searches within the permanent database 6 for information regarding the user which has previously been associated with such fingerprint information. Thereby, the fingerprint information allows to hypothesize the use of a device without it having been authenticated by entering the credentials thereof, similar to what occurs with UUID and IP.

In accordance with a preferred solution, the step of monitoring the browsing sessions at risk associated with each username in the watch list when the respective user performs further authentication to the online service, comprises the sub-step of:
- comparing by means of the detection algorithm 8 the first characteristic data associated with a username in the watch list with the first characteristic data collected by the traffic inspector 1 when the respective user performs further authentication to the online service to identify the presence of any anomalies. In FIG. 2, the first characteristic data collected by the traffic inspector 1 when the respective user in the watch list performs further authentication to the online service are indicated with IP2 and UUID2.

According to a preferred solution of the invention, the step of comparing, by means of the detection algorithm 8, the first characteristic data associated with a username in the watch list with the first characteristic data collected by the traffic inspector 1 when the respective user performs further authentication to the online service to identify the presence of any anomalies, comprises the sub-step of:

generating a warning P when the first characteristic data associated with a username in the watch list differ from the first characteristic data collected by the traffic inspector 1 when the respective user performs further authentication to the online service.

In accordance with a preferred solution, the step of identifying each browsing session of the client device 2, and preferably the web browser 3, on the online service by the traffic inspector 1 comprises the sub-step of:

identifying each browsing session of the client device 2, and preferably the web browser 3, on the online service by the traffic inspector 1 using session cookies.

Preferably, the step of identifying each browsing session of the client device 2, and preferably of the web browser 3, on the online service by the traffic inspector 1, comprising the sub-step of intercepting, by the traffic inspector 1, an HTTP request sent from the web browser 3 to the web server 4. Furthermore, the step of analyzing the traffic exchanged between the web browser 3 and the web server 4 by the traffic analyzer 5 to extract and identify at least one username when a user performs authentication to the online service, comprises the step of extracting a username from the HTTP request intercepted by the traffic inspector 1 when a user performs authentication to the online service by means of an extraction algorithm 10 residing in the traffic analyzer 5 and based on regular expressions.

Advantageously, the method of the present invention allows to identify any risks, including technical risks or an action for example in the case of video on demand (VOD), deriving from an account take over attack.

Still advantageously, the method of the present invention allows to provide a prediction of the identity of the user acting in an area which is anonymous as it is not yet authenticated, generating by means of the user prediction algorithm 7 a list of potential users which could be hiding behind the anonymous browsing session. These users, in case a risk is detected in the related browsing session by means of the detection algorithm 8, are entered in a watch list. In doing so, each subsequent authenticated browsing session by a user in the watch list is controlled, so that they can request additional access credentials by means of the protection algorithm 9 and possibly lock the session in the event of a concrete threat.

Advantageously, the method of the present invention allows to identify and prevent any account take over attacks carried out against registered users of an online service.

An exemplary application of the method of the present invention is described below, with particular reference to the sequences of steps illustrated in FIGS. 3, 4 and 5.

Figure 3:
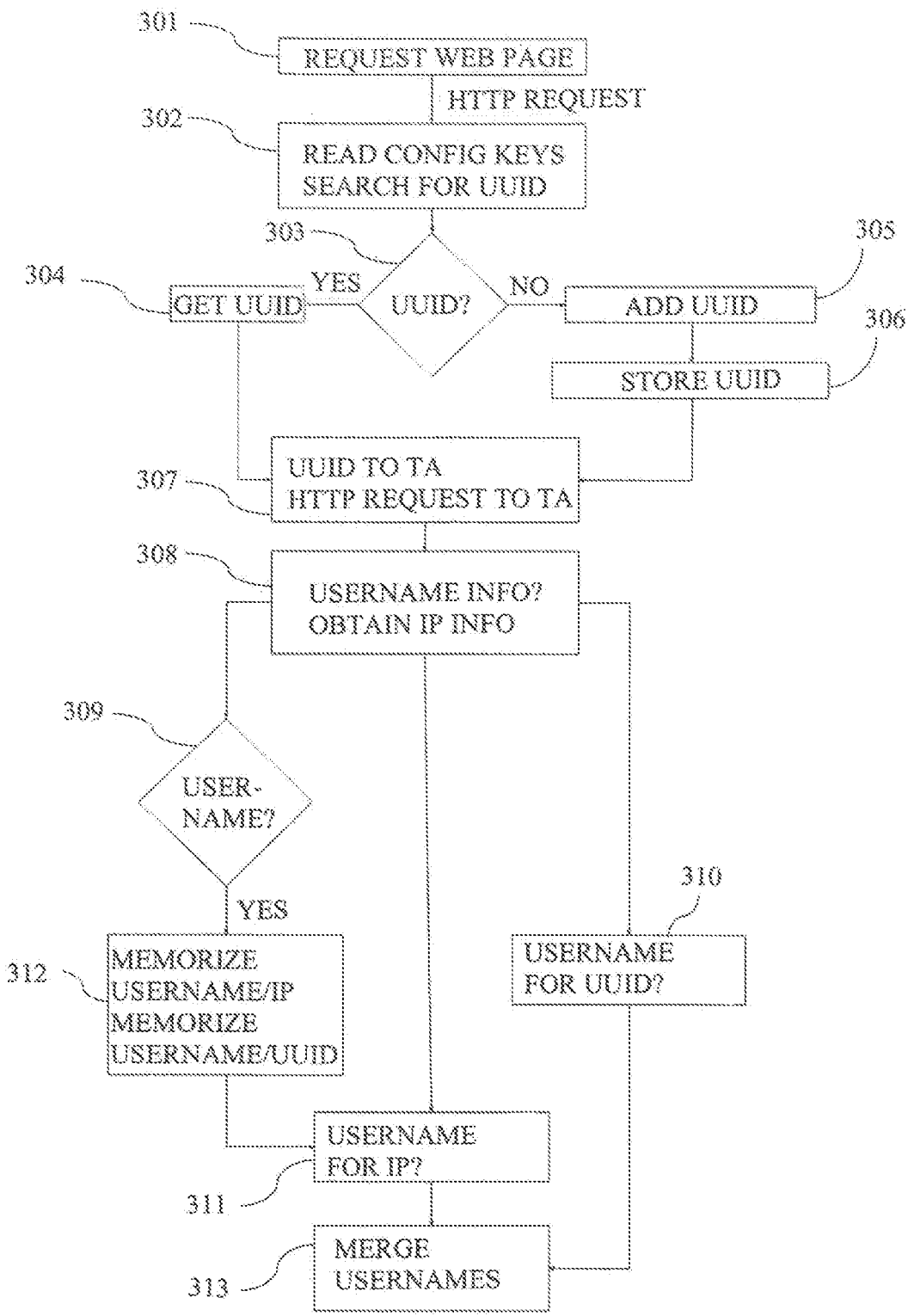
FIG. 3 shows a flow chart of a sequence of steps of an embodiment of the method according to the first embodiment of the present invention.

With particular reference to FIG. 3, the step of identifying each browsing session of the web browser 3 on the online service by the traffic inspector 1 includes:

sub-step 301 in which the user requests a web page by means of a web browser 3 which sends an HTTP request to the web server 4.

The step of analyzing the traffic exchanged between the web browser 3 and the web server 4 by the traffic analyzer 5 to extract and identify at least one username when a user performs authentications to the online service includes:

sub-step 302 in which the traffic inspector 1 reads the configuration keys and searches for a particular UUID in the HTTP request;

sub-step 303 of determining whether a UUID is present in the HTTP request;

sub-step 304 to obtain the UUID, if present;

sub-step 305 to add a UUID to the HTTP request if not present, and sub-step 306 to store the UUID in the web browser 3;

sub-step 307 in which the traffic inspector 1 sends the HTTP request to the traffic analyzer 5;

sub-step 308 in which the traffic analyzer 5 searches for username information in the HTTP request and obtains information about IPs present in the HTTP request.

The step of collecting, by the traffic inspector 1, first characteristic data concerning unique and/or non-unique technical parameters and associating, by the traffic analyzer 5, the first characteristic data with a respective identified username, includes:

sub-step 309 to check if there is a username in the HTTP request;

sub-step 310 in which the traffic analyzer 5 searches for usernames already associated with the UUID received;

sub-step 311 in which the traffic analyzer 5 searches the database 6 for usernames already associated with received IPs.

The step of storing the first characteristic data associated with each username identified in a database 6 associated with the traffic analyzer 5 includes:

if the username is present in the HTTP request, sub-step 312 in which the traffic analyzer 5 stores the associations A detected between username and IP, and stores the associations A detected between username and UUID in the database 6;

sub-step 313 in which the traffic analyzer 5 joins the usernames according to predefined rules and produces a refined list of usernames.

Figure 4:
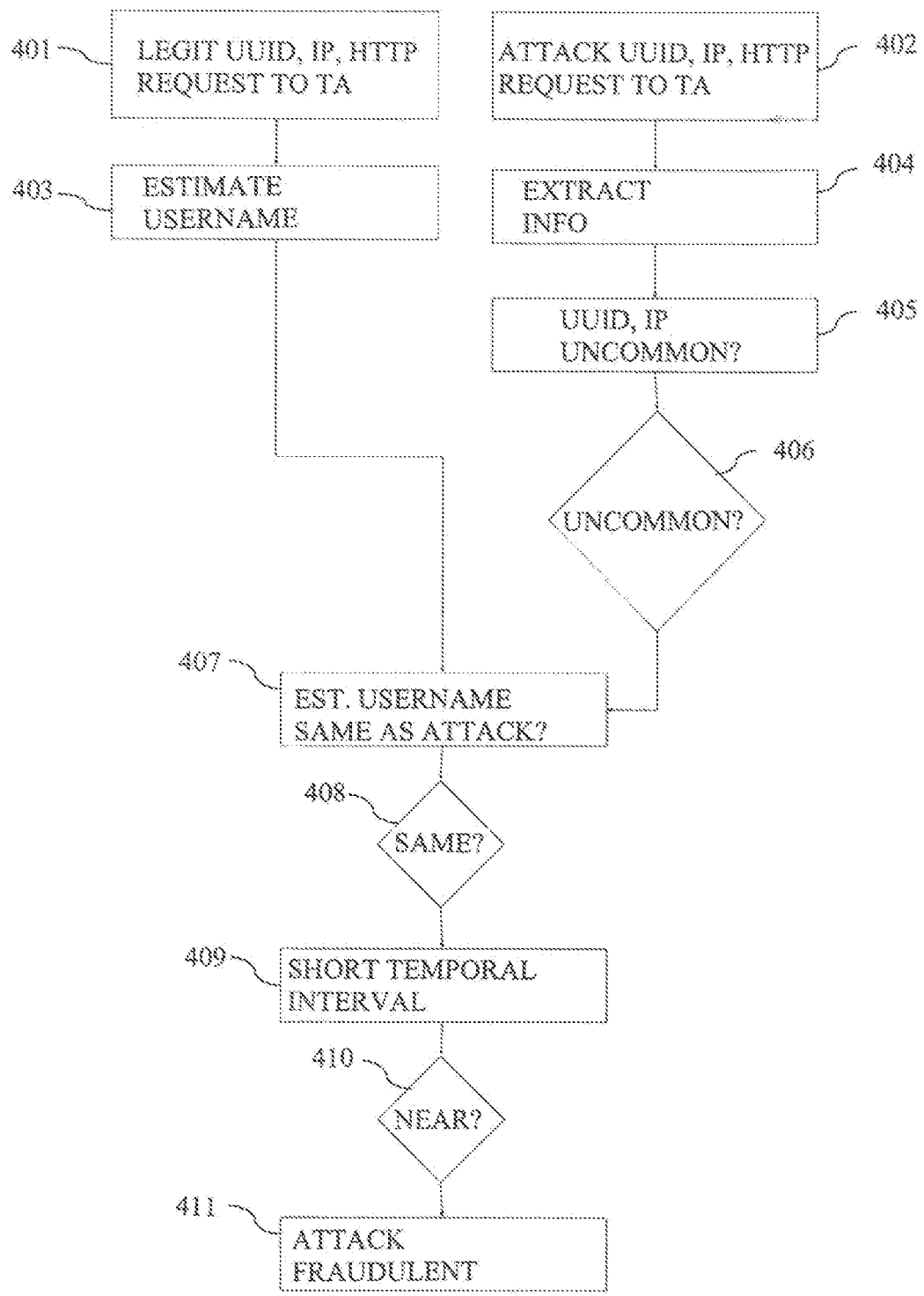
FIG. 4 shows a flow chart of a further sequence of steps of the example of FIG. 3.
Figure 5:
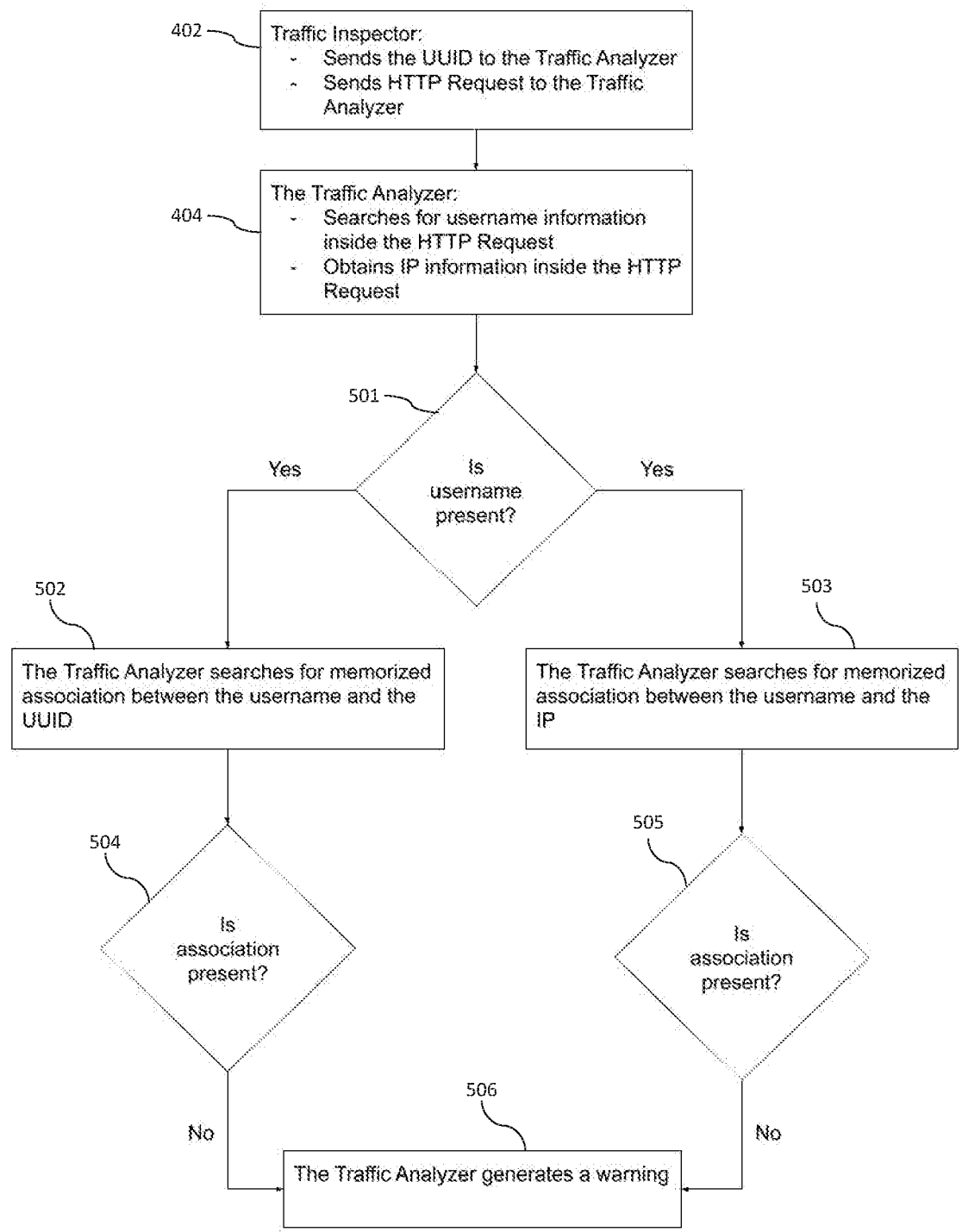
FIG. 5 shows a flow chart of a further sequence of steps of the example of FIGS. 3 and 4.

With particular reference to FIGS. 4 and 5, sub-step 307 in which the traffic inspector 1 sends the UUID and the HTTP request to the traffic analyzer 5, includes:

sub-step 401 in which the traffic inspector 1 sends legitimate UUIDs and IPs to the traffic analyzer 5 and sends the legitimate HTTP request to the traffic analyzer 5, where legitimate means that it is an authenticated, secure and user-managed browsing session;

sub-step 402 in which the traffic inspector 1 sends the imposter UUID and IP to the traffic analyzer 5 and sends the imposter HTTP request to the traffic analyzer 5.

The step of comparing by means of a user prediction algorithm 7 residing in the traffic analyzer 5 the first characteristic data concerning each identified username with the second characteristic data concerning the anonymous session to associate an identified username with the anonymous browsing session in case of similarity or substantial coincidence between the first characteristic data and the second characteristic data so compared, includes:

sub-step 403 in which the traffic analyzer 5 estimates the possible legitimate username behind the anonymous browsing session as a function of UUID, IP and user prediction algorithm 7.

The step of collecting, by the traffic inspector 1, first characteristic data concerning unique and/or non-unique technical parameters and associating, by the traffic analyzer 5, the first characteristic data with a respective identified username, includes:

sub-step 404 in which the traffic analyzer 5 extracts information about the username from the HTTP request concerning the authenticated browsing session, subsequent to the anonymous session in which the username of the same user was predicted in sub-step 403.

The step of generating a warning P when the first characteristic data associated with a username in the watch list differ from the first characteristic data collected by the traffic inspector 1 when the respective user performs further authentication to the online service, includes:

sub-step 405 in which the traffic analyzer 5 determines whether UUID and IP are unusual for the username;

if it determines that UUID and IP are unusual 406, sub-step 407 in which the traffic analyzer 5 determines whether the estimated legitimate username of the anonymous session is the same one extracted from the imposter's authenticated HTTP request;

if the username is the same 408, sub-step 409 in which the traffic analyzer 5 determines whether the two requests have occurred in a limited time interval;

if the first anonymous and then authenticated sessions of the same user are close 410, i.e., if they occurred in a limited time interval, sub-step 411 in which the traffic analyzer 5 establishes that the imposter's request is fraudulent.

Sub-step 405 includes:

sub-step 501 to check if the username is present in the HTTP request;

sub-step 502 in which the traffic analyzer 5 searches if associations A between username and UUID are stored in the database 6;

sub-step 503 in which the traffic analyzer 5 searches if associations A between username and IP are stored in the database 6;

if the association A between username and UUID 504 is not detected and/or if the association A between username and IP 505 is not detected, sub-step 506 in which the traffic analyzer 5 generates a warning P.

A second embodiment, alternative or combinable with the previous one (see the third embodiment described below), of the method of monitoring and protecting access to an online service according to the present invention from account take over is described below.

Figure 6:
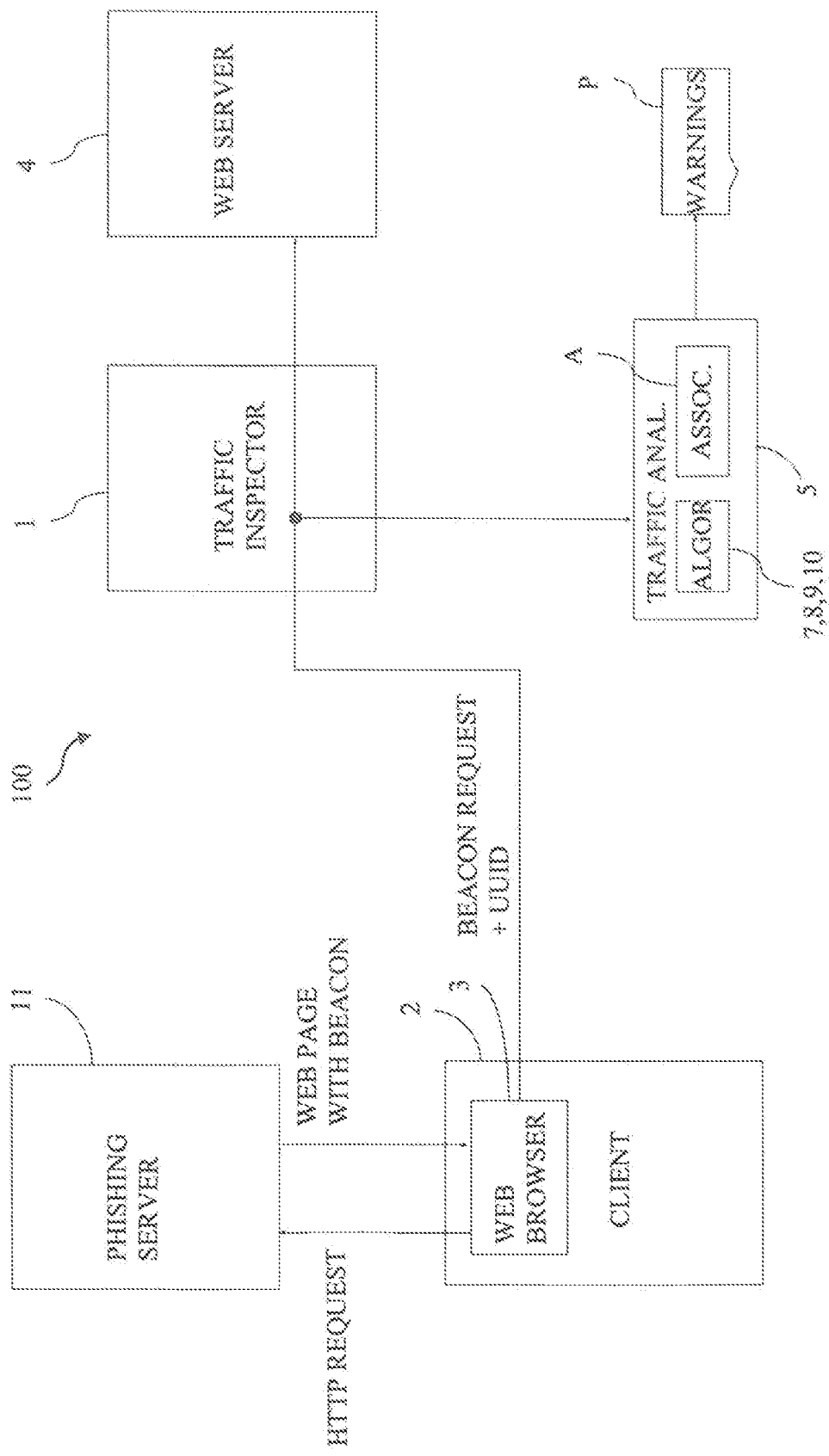
FIG. 6 shows a system 100 in which a second embodiment of the method of the present invention can be applied.

In the attached FIG. 6, the number 100 refers to a system in which a first embodiment of the method of the present invention can be applied. In other words, the system 100 is referred to as a network environment, clearly consisting of devices and network components for hardware-type internet browsing, such as servers, databases and processing units, in which the second embodiment of the method of the present invention can be applied.

In accordance with the second embodiment, the method of monitoring and protecting access to an online service from account take over, comprising the step of providing a traffic inspector 1 in signal communication with at least one client device 2 for internet browsing and with a web server 4 having an online service residing therein.

The method also comprises the step of providing a traffic analyzer 5 in signal communication with the traffic inspector 1.

Furthermore, the method comprises the step of identifying each browsing session of the client device 2 on the online service by the traffic inspector 1.

The method comprises the step of analyzing the traffic exchanged between the client device 2 and the web server 4, by the traffic analyzer 5 to extract and identify at least one username when a user performs authentications to the online service.

In addition, the method comprises the step of collecting by the traffic inspector 1 first characteristic data concerning unique and/or non-unique technical parameters and associating the first characteristic data with a respective identified username by the traffic analyzer 5.

The method comprises the step of storing the first characteristic data associated with each identified username in a database 6 associated with the traffic analyzer 5.

The method further comprises the step of identifying each anonymous web beacon generated by the client device 2 on the online service by the traffic analyzer 5, the web beacon indicating that the client device 2 has initiated a fraudulent browsing session on a phishing web server 11.

Within the scope of the present invention, web beacons means an element included in a web page intended to monitor the actual display of the page by a user. For example, a web beacon could be an image or another type of static resource referenced by the web page. When the user obtains the web page from the web server 4 by means of a request, the beacons are not sent directly. When the page is displayed within the user's client device 2, for example through a web browser 3, the beacons referenced within the web page are requested from the web server 4. Therefore, it is possible to identify whether the online service page has actually been displayed on the client device 2 by checking in the register of requests to the web server 4 whether requests for beacons have been sent. A web beacon could be a resource already on the page (for example, a logo or other graphic elements). Or it could be an image, for example an image consisting of a single transparent pixel inserted specifically in order to ensure monitoring. These resources comprise a reference consisting of a unique name within the web page.

Furthermore, the method comprises the step of collecting by the traffic inspector 1 third characteristic data concerning unique and/or non-unique technical parameters and associating the third characteristic data with the anonymous web beacon via the traffic analyzer 5.

The method comprises the step of comparing by a user prediction algorithm 7 residing in the traffic analyzer 5 the first characteristic data concerning each identified username with the third characteristic data concerning the anonymous web beacon to associate the anonymous web beacon with an identified username in case of similarity or substantial coincidence between the first characteristic data and the third characteristic data so compared.

The method further comprises the step of analyzing by a detection algorithm 8 residing in the traffic analyzer 5 each anonymous web beacon associated with one or more identified usernames to enter each username associated with the anonymous web beacon in which a situation involving risk of credential theft following a phishing attack is detected in a watch list.

The method comprises the step of monitoring the browsing sessions at risk associated with each username in the watch list when the respective user performs further authentication to the online service. In addition, this step involves identifying an account take over attack by the client device 2 when the anonymous browsing session and the subsequent authenticated session associated with the same username entered in the watch list are close in time. Furthermore, this step involves protecting access to the online service when an account take over risk is identified.

According to a preferred form, the step of monitoring the browsing sessions associated with each username in the watch list comprises the sub-steps of:

identifying by means of the detection algorithm 8 the browsing sessions at risk associated with each username in the watch list when the respective user performs authentication to the online service;

protecting the browsing sessions at risk using a protection algorithm 9 residing in the traffic analyzer 5.

Preferably, the step of protecting the browsing session at risk using the protection algorithm 9 comprises the step of locking the username of the user associated with the browsing session at risk or executing a Strong Customer Authentication algorithm for the username of the user associated with the browsing session at risk or executing a Multi-Factor Authentication algorithm for the username of the user associated with the browsing session at risk.

Preferably, the step of monitoring the browsing sessions associated with each username in the watch list comprises the step of generating a risk signal indicative of the presence of a possible threat associated with the phishing attack in the browsing session at risk.

According to a preferred form, the method comprises the step of removing a username from the watch list when the detection algorithm 8 detects that the phishing attack is over.

Preferably, the step of removing a username from the watch list comprises the step of removing a username from the watch list when a predefined time interval has elapsed from the moment when the detection algorithm 8 has detected that the malware attack is over.

In accordance with a preferred solution, the step of collecting, by the traffic inspector 1, first characteristic data concerning unique and/or non-unique technical parameters and associating, by the traffic analyzer 5, the first characteristic data with a respective identified username comprises the sub-step of collecting, by the traffic inspector 1, first characteristic data concerning one or more of unique technical parameters, non-unique technical parameters, endpoints, networks and browsers. Preferably, the step of collecting, by the traffic inspector 1, third characteristic data concerning unique and/or non-unique technical parameters and associating, by the traffic analyzer 5, the third characteristic data with the anonymous web beacon, comprises the sub-step of collecting, by the traffic inspector 1, third characteristic data concerning one or more of unique technical parameters, non-unique technical parameters, endpoints and browsers.

Preferably, the first characteristic data and the third characteristic data comprise UUID and IP.

According to a preferred form, the step of monitoring the browsing sessions at risk associated with each username in the watch list when the respective user performs further authentication to the online service, comprises the sub-step of comparing, by the detection algorithm 8, the first characteristic data associated with a username in the watch list with the first characteristic data collected by the traffic inspector 1 when the respective user performs further authentication to the online service to identify the presence of any anomalies.

According to a preferred solution, the step of comparing, by the detection algorithm 8, the first characteristic data associated with a username in the watch list with the first characteristic data collected by the traffic inspector 1 when the respective user performs further authentication to the online service to identify the presence of any anomalies, comprises the sub-step of generating a warning P when the first characteristic data associated with a username in the watch list differ from the first characteristic data collected by the traffic inspector 1 when the respective user performs further authentication to the online service.

Preferably, the step of identifying each generated anonymous web beacon of the client device 2 on the online service by the traffic analyzer 5, comprises the step of identifying each generated anonymous web beacon of the client device 2 on the online service by the traffic analyzer 5 using session cookies.

According to a preferred form, the step of identifying each browsing session of the client device 2 on the online service by the traffic inspector 1, comprising the sub-step of intercepting by the traffic inspector 1 an HTTP request sent by a web browser 3 residing in the client device 2 to the web server (4). Preferably, the step of analyzing the traffic exchanged between the client device 2 and the web server 4 by the traffic analyzer 5 to extract and identify at least one username when a user performs authentication to the online service, comprises the step of extracting a username from the HTTP request intercepted by the traffic inspector 1 when a user performs authentication to the online service by means of an extraction algorithm 10 residing in the traffic analyzer 5 and based on regular expressions.

According to a preferred form, the method comprises the step of modifying the online service by inserting a web beacon therein. For the purpose of searching for phishing sites, it is important that the resources constituting the web beacon are entered in site locations which are difficult to identify by the imposter F, to prevent them from being removed during the cloning operation of the legitimate site.

Preferably, the web beacon comprises an HTTP request from a resource residing within the web server 4. Preferably, the step of identifying each generated anonymous web beacon of the client device 2 on the online service by the traffic analyzer 5 comprises the sub-step of intercepting by the traffic inspector 1 each HTTP request associated with an anonymous web beacon. Still preferably, the step of collecting by the traffic inspector 1 third characteristic data concerning unique and/or non-unique technical parameters and associating by the traffic analyzer 5 the third characteristic data with the anonymous web beacon; comprises the sub-step of sending by the traffic inspector 1 the third characteristic data to the traffic analyzer 5, the third characteristic data being associated with unique and/or non-unique technical parameters characteristic of the request associated with the anonymous web beacon.

Preferably, the step of analyzing by means of a detection algorithm 8 residing in the traffic analyzer 5 each anonymous web beacon associated with one or more identified usernames to enter each username associated with the anonymous web beacon in which a situation involving risk of credential theft following phishing in a watch list, comprises the sub-steps of:

analyzing whether each HTTP request intercepted by the traffic inspector 1 and concerning a web beacon associated with a username comes from the legitimate domain of the online service;

generating a warning P when an HTTP request does not come from the legitimate domain of the online service.

More preferably, the step of generating a warning P when an HTTP request does not come from the legitimate domain of the online service comprises the step of sending the warning P to the user holding the username associated with the web beacon concerning the HTTP request not coming from the legitimate domain of the online service.

Advantageously, the user accesses the malicious site from an IP and/or with a UUID typically associated with the username thereof. Such characteristic information is transported within resource requests made to the legitimate server. They can thereby be intercepted by the traffic inspector 2 and sent to the traffic analyzer 5. The traffic analyzer 5 is capable of analyzing the requests and detecting phishing attacks using known art techniques. Furthermore, the traffic analyzer 5 is capable of associating identified phishing attacks with an unidentified user using characteristic information such as IP and UUID associated with requests.

Preferably, the step of identifying each generated anonymous web beacon of the client device 2 on the online service by the traffic analyzer 5 is performed by the detection algorithm 8.

The present invention also relates to a third embodiment of the invention which includes the combination of the previous embodiments, i.e., a combination of the first embodiment with the second embodiment.

The third embodiment relates to a method of monitoring and protecting access to an online service from account take over comprising the step of providing a traffic inspector 1 in signal communication with at least one client device 2 for internet browsing and with a web server 4 having an online service residing therein.

The method comprises the step of providing a traffic analyzer 5 in signal communication with the traffic inspector 1.

The method comprises the step of identifying each browsing session of the client device 2 on the online service by the traffic inspector 1.

Furthermore, the method comprises the step of analyzing the traffic exchanged between the client device 2 and the web server 4 by the traffic analyzer 5 to extract and identify at least one username when a user performs authentication to the online service.

The method also comprises the step of collecting by the traffic inspector 1 first characteristic data concerning unique and/or non-unique technical parameters and associating the first characteristic data with a respective identified username by the traffic analyzer 5.

The method comprises the step of storing the first characteristic data associated with each identified username in a database 6 associated with the traffic analyzer 5.

The method comprises the step of identifying by the traffic analyzer 5 each anonymous application session and each anonymous virtual session of the client device 2 on the online service.

For each anonymous application session identified in the previous step, the method comprises the following steps:
   identifying an anonymous browsing session of the client device 2 on the online service by the traffic analyzer 5;
   collecting by the traffic inspector 1 second characteristic data concerning unique and/or non-unique technical parameters and associating by the traffic analyzer 5 the second characteristic data with the anonymous browsing session;
   comparing by means of a user prediction algorithm 7 residing in the traffic analyzer 5 the first characteristic data concerning each identified username with the second characteristic data concerning the anonymous session to associate an identified username with the anonymous browsing in case of similarity or substantial coincidence between the first characteristic data and the second characteristic data so compared;
   analyzing by means of a detection algorithm 8 residing in the traffic analyzer 5 each anonymous browsing session associated with one or more identified usernames to enter each username associated with the anonymous browsing session in which a situation involving a risk of credential theft has been detected in a watch list;

For each anonymous virtual session identified in the previous step, the method comprises the following steps:
   identifying each anonymous web beacon generated by the client device 2 on the online service by the traffic analyzer 5, the web beacon indicating that the client device 2 has initiated a fraudulent browsing session on a phishing web server 11;
   collecting by the traffic inspector 1 third characteristic data concerning unique and/or non-unique technical parameters and associating the third characteristic data with the anonymous web beacon via the traffic analyzer 5;
   comparing by means of the user prediction algorithm 7 residing in the traffic analyzer 5 the first characteristic data concerning each identified username with the third characteristic data concerning the anonymous web beacon to associate the anonymous web beacon with an identified username in case of similarity or substantial coincidence between the first characteristic data and the third characteristic data so;
   analyzing by means of a detection algorithm 8 residing in the traffic analyzer 5 each anonymous web beacon associated with one or more identified usernames to enter each username associated with the anonymous web beacon in which a situation involving risk of credential theft following a phishing attack is detected in the watch list.

In addition, the method comprises the step of monitoring the browsing sessions at risk associated with each username in the watch list when the respective user further performs authentication to the online service. In addition, this step involves identifying an account take over attack by the client device 2 when the anonymous browsing session and the subsequent authenticated session associated with the same username entered in the watch list are close in time. Furthermore, this step involves protecting access to the online service when an account take over risk is identified.

It should be noted here that the steps and sub-steps described for the first and second embodiments may also be applied to the method of the third embodiment, as the latter is a synergistic combination of the two preceding embodiments. In particular, the steps and sub-steps concerning the method of the first embodiment are applicable in the case of anonymous application sessions, while the steps and sub-steps of the method of the second embodiment are applicable in the case of virtual anonymous sessions.

Advantageously, by virtue of the method of the third embodiment it is possible to intercept all the anonymous requests or web beacons generated by the client device so as to be able to identify and prevent any risks related, respectively, to credential theft attacks by malware and/or phishing.

Obviously, in order to satisfy specific and contingent needs, a person skilled in the art may apply numerous changes to the variants described above, all without departing from the scope of protection as defined by the following claims.

The invention claimed is:

1. A method of monitoring and protecting access to an online service from Account Take Over, the method comprising:
    providing a Traffic Inspector in signal communication with at least one client device for Internet browsing and with a web server having the online service residing therein;
    providing a Traffic Analyzer in signal communication with the Traffic Inspector;
    identifying, by the Traffic Inspector, each browsing session of the at least one client device on the online service;
    extracting and identifying, by the Traffic Analyzer, one or more usernames when a user performs authentication to the online service by analyzing traffic exchanged between the at least one client device and the web server;
    collecting, by the Traffic Inspector, first characteristic data concerning unique technical parameters, non-unique technical parameters, or unique and non-unique technical parameters and associating, by the Traffic Analyzer, the first characteristic data with respective identified one or more usernames;
    storing the first characteristic data associated with each of the identified one or more usernames in a database associated with the Traffic Analyzer;
    identifying, by the Traffic Analyzer, each anonymous web beacon generated by the at least one client device on the online service, wherein the anonymous web beacon indicates that the at least one client device has started a fraudulent browsing session on a phishing web server;
    collecting, by the Traffic Inspector, second characteristic data concerning unique technical parameters, non-unique technical parameters, or unique and non-unique technical parameters and associating, by the Traffic Analyzer, the second characteristic data with the anonymous web beacon;
    associating an identified username with the anonymous web beacon when the first characteristic data, concerning each of the identified one or more usernames, and the second characteristic data, concerning the anonymous web beacon, compared using a user prediction algorithm residing in the Traffic Analyzer, are at least in part identical or coincident;
    entering each identified username associated with the anonymous web beacon, in which a situation involving a risk of credential theft has been detected after a phishing attack, in a watch list by analyzing, using a detection algorithm residing in the Traffic Analyzer, each anonymous web beacon associated with the identified one or more usernames; and
    monitoring the browsing sessions in which the risk of credential theft has been detected associated with each identified username in the watch list when the user performs further authentication to the online service, and identifying an Account Take Over attack by the at least one client device and protecting access to the online service when the browsing session relating to the anonymous web beacon and a subsequent authenticated browsing session associated with the same username entered in the watch list occur in a limited time interval.

2. The method of claim 1, wherein the monitoring of the browsing sessions associated with each identified username in the watch list comprises:
    identifying, using the detection algorithm, the browsing sessions at risk associated with each identified username in the watch list when the user performs authentication to the online service; and
    protecting the browsing sessions at risk using a protection algorithm residing in the Traffic Analyzer.

3. The method of claim 2, wherein the protecting of the browsing sessions at risk using the protection algorithm comprises:
    locking the username of the user associated with the browsing sessions at risk, executing a Strong Customer Authentication (SCA) algorithm for the username of the user associated with the browsing sessions at risk, or executing a Multi-Factor Authentication (MFA) algorithm for the username of the user associated with the browsing sessions at risk.

4. The method of claim 2, wherein the monitoring of the browsing sessions associated with each identified username in the watch list comprises:
    generating a risk signal indicative of a possible threat associated with a phishing attack in the browsing sessions at risk.

5. The method of claim 1, further comprising:
    removing a username from the watch list when the detection algorithm detects that the phishing attack is over.

6. The method of claim 5, wherein the removing of the username from the watch list comprises:
    removing the username from the watch list when a predetermined time interval has elapsed from a time in which the detection algorithm has detected that the phishing attack is over.

7. The method of claim 1, wherein the collecting, by the Traffic Inspector, of the first characteristic data concerning unique technical parameters, non-unique technical parameters, or unique and non-unique technical parameters and the associating, by the Traffic Analyzer, of the first characteristic data with the identified one or more usernames comprises:
    collecting, by the Traffic Inspector, of the first characteristic data concerning one or more of unique technical parameters, non-unique technical parameters, endpoints, networks, and browsers; and
    wherein the collecting, by the Traffic Inspector, of the second characteristic data concerning unique technical parameters, non-unique technical parameters, or unique and non-unique technical parameters and the associating, by the Traffic Analyzer, of the second characteristic data with the anonymous web beacon comprises:
    collecting, by the Traffic Inspector, of the second characteristic data concerning one or more of unique technical parameters, non-unique technical parameters, endpoints, networks, and browsers.

8. The method of claim 7, wherein the first characteristic data and the second characteristic data comprise a Universally Unique Identifier (UUID) and Internet Protocol (IP) address.

9. The method of claim 1, wherein the monitoring of the browsing sessions in which the risk of credential theft has been detected associated with each identified username in the watch list when the user performs the further authentication to the online service comprises:
    comparing, using the detection algorithm, of the first characteristic data associated with a username in the watch list with the first characteristic data collected by the Traffic Inspector when the user performs the further authentication to the online service to identify any anomalies.

10. The method of claim 9, wherein the comparing, using the detection algorithm, of the first characteristic data associated with the username in the watch list with the first characteristic data collected by the Traffic Inspector when the user performs the further authentication to the online service to identify any anomalies, comprises:
generating a warning when the first characteristic data associated with the username in the watch list differs from the first characteristic data collected by the Traffic Inspector when the user performs the further authentication to the online service.

11. The method of claim 1, wherein the identifying, by the Traffic Analyzer, of each anonymous web beacon generated by the at least one client device on the online service comprises:
identifying, by the Traffic Analyzer, each anonymous web beacon generated by the at least one client device on the online service using session cookies.

12. The method of claim 1, wherein the identifying, by the Traffic Inspector, of each browsing session of the at least one client device on the online service comprises:
intercepting, by the Traffic Inspector, a Hypertext Transfer Protocol (HTTP) request sent by a web browser residing in the at least one client device to the web server; and
wherein the extracting and identifying, by the Traffic Analyzer, of the one or more usernames when the user performs authentication to the online service comprises:
extracting a username from the HTTP request intercepted by the Traffic Inspector when the user performs authentication to the online service using an extraction algorithm residing in the Traffic Analyzer and based on regular expressions.

13. The method of claim 1, further comprising:
modifying the online service by introducing a web beacon therein.

14. The method of claim 1, wherein the anonymous web beacon includes a Hypertext Transfer Protocol (HTTP) request for a resource residing in the web server,
wherein the identifying, by the Traffic Analyzer, of each generated anonymous web beacon of the at least one client device on the online service comprises:
intercepting, by the Traffic Inspector, each HTTP request associated with the anonymous web beacon; and
wherein the collecting, by the Traffic Inspector, of the second characteristic data concerning unique technical parameters, non-unique technical parameters, or unique and non-unique technical parameters and associating, by the Traffic Analyzer, of the second characteristic data with the anonymous web beacon comprises:
sending, by the Traffic Inspector, of the second characteristic data to the Traffic Analyzer, the second characteristic data being associated with the unique technical parameters, non-unique technical parameters, or unique and non-unique technical parameters characteristic of the request for the resource associated with the anonymous web beacon.

15. The method of claim 14, wherein the entering of each identified username associated with the anonymous web beacon, in which the situation involving the risk of credential theft has been detected after the phishing attack, in the watch list, comprises:
analyzing whether each HTTP request intercepted by the Traffic Inspector and concerning the anonymous web beacon associated with a username comes from a legitimate domain of the online service; and
generating a warning when an HTTP request does not come from the legitimate domain of the online service.

16. The method of claim 1, wherein the first characteristic data and the second characteristic data are at least in part identical or coincident when at least one of the unique technical parameters, non-unique technical parameters, or unique and non-unique technical parameters of the first characteristic data is identical to at least one of the unique technical parameters, non-unique technical parameters, or unique and non-unique technical parameters of the second characteristic data.

17. The method of claim 1, wherein the first characteristic data and the second characteristic data are at least in part identical or coincident when at least one of the unique technical parameters of the first characteristic data is identical to at least one of the unique technical parameters of the second characteristic data.

18. The method of claim 1, wherein the first characteristic data and the second characteristic data are at least in part identical or coincident when at least one of the non-unique technical parameters of the first characteristic data is identical to at least one of the non-unique technical parameters of the second characteristic data.

19. A method of monitoring and protecting access to an online service from Account Take Over, the method comprising:
providing a Traffic Inspector in signal communication with at least one client device for Internet browsing and with a web server having the online service residing therein;
providing a Traffic Analyzer in signal communication with the Traffic Inspector;
identifying, by the Traffic Inspector, each browsing session of the at least one client device on the online service;
extracting and identifying, by the Traffic Analyzer, one or more usernames when a user performs authentication to the online service by analyzing traffic exchanged between the at least one client device and the web server;
collecting, by the Traffic Inspector, first characteristic data concerning unique technical parameters, non-unique technical parameters, or unique and non-unique technical parameters and associating, by the Traffic Analyzer, the first characteristic data with respective identified one or more usernames;
storing the first characteristic data associated with each of the identified one or more usernames in a database associated with the Traffic Analyzer;
identifying, by the Traffic Analyzer, each anonymous web beacon generated by the at least one client device on the online service, wherein the anonymous web beacon indicates that the at least one client device has started a fraudulent browsing session on a phishing web server;
collecting, by the Traffic Inspector, second characteristic data concerning unique technical parameters, non-unique technical parameters, or unique and non-unique technical parameters and associating, by the Traffic Analyzer, the second characteristic data with the anonymous web beacon;
associating an identified username with the anonymous web beacon when the first characteristic data, concerning each of the identified one or more usernames, and the second characteristic data, concerning the anonymous web beacon, compared using a user prediction algorithm residing in the Traffic Analyzer, are at least in part identical or coincident;

entering each identified username associated with the anonymous web beacon, in which a situation involving a risk of credential theft has been detected after a phishing attack, in a watch list by analyzing, using a detection algorithm residing in the Traffic Analyzer, each anonymous web beacon associated with the identified one or more usernames; and monitoring the browsing sessions in which the risk of credential theft has been detected associated with each identified username in the watch list when the user performs further authentication to the online service, and identifying an Account Take Over attack by the at least one client device and protecting access to the online service when a subsequent authenticated browsing session associated with the same username entered in the watch list is a next browsing session that occurs in a limited time interval after the browsing session relating to the anonymous web beacon.

20. The method of claim 19, wherein the first characteristic data and the second characteristic data are at least in part identical or coincident when at least one of the unique technical parameters, non-unique technical parameters, or unique and non-unique technical parameters of the first characteristic data is identical to at least one of the unique technical parameters, non-unique technical parameters, or unique and non-unique technical parameters of the second characteristic data.

* * * * *